United States Patent [19]
Jang et al.

[11] Patent Number: 5,414,543
[45] Date of Patent: May 9, 1995

[54] METHOD FOR MANUFACTURING A MULTIPLE LEVEL LIQUID CRYSTAL DISPLAY USING ALTERNATING METAL AND METAL OXIDE LAYERS

[75] Inventors: In-sik Jang; Nobuyuki Yamamura, both of Suwon, Rep. of Korea

[73] Assignee: Samsung Electronics Co., Ltd., Suwon, Rep. of Korea

[21] Appl. No.: 111,064

[22] Filed: Aug. 24, 1993

Related U.S. Application Data

[63] Continuation-in-part of Ser. No. 58,712, May 10, 1993.

[30] Foreign Application Priority Data

Aug. 24, 1992 [KR] Rep. of Korea ............... 15192/92

[51] Int. Cl.⁶ ................... G02F 1/133; G02F 1/1333
[52] U.S. Cl. ........................................ 359/53; 359/79
[58] Field of Search ................. 359/53, 62, 79, 81, 359/51

[56] References Cited

U.S. PATENT DOCUMENTS

| | | | |
|---|---|---|---|
| 3,886,014 | 5/1985 | Bayer | 156/145 |
| 4,581,608 | 4/1986 | Aftergut et al. | 340/704 |
| 4,659,182 | 4/1987 | Aizawa | 350/339 F |
| 4,813,770 | 3/1989 | Clerc et al. | 350/347 E |
| 4,878,741 | 11/1989 | Fergason | 350/339 F |
| 4,886,343 | 12/1989 | Johnson | 350/335 |
| 5,113,272 | 5/1992 | Reamey | 359/53 |
| 5,221,978 | 6/1993 | Heynderickx et al. | 359/53 |
| 5,248,576 | 9/1993 | Yokoyama et al. | 430/7 |
| 5,276,538 | 1/1994 | Monji et al. | 359/40 |

FOREIGN PATENT DOCUMENTS

57-196214 12/1982 Japan ........................ 359/53

*Primary Examiner*—Anita Pellman Gross
*Assistant Examiner*—Charles Miller
*Attorney, Agent, or Firm*—Charles R. Donohoe; Robert A. Westerlund, Jr.; Stephen R. Whitt

[57] ABSTRACT

A method of obtaining a multi-level liquid crystal device repeatedly applies a metal layer and then oxidizes a portion of that metal layer. Thereafter, the non-oxidized layers are removed, leaving empty layered spaces into which liquid crystal can be filled.

13 Claims, 9 Drawing Sheets

METHOD FOR MANUFACTURING A MULTIPLE LEVEL LIQUID CRYSTAL DISPLAY USING ALTERNATING METAL AND METAL OXIDE LAYERS

This application is a continuation-in-part of application Ser. No. 08/058,712 filed on may 10, 1993 (pending).

BACKGROUND OF THE INVENTION

The present invention relates to a method for manufacturing a liquid crystal display device which is used in an optical display, and more particularly to a method for forming an insulation layer to partition liquid crystal layers in a liquid crystal display having a multi-layer liquid crystal structure.

Currently utilized liquid crystal display devices, of an active matrix type use a simple X-Y matrix or thin film transistor (TFT) driving method. Both driving methods use a twisted nematic (TN) type or super twisted nematic (STN) type liquid crystal and a polarizing plate for controlling light. However, the polarizing plate in the liquid crystal display (LCD) intercepts more than 50% of the light. Accordingly, efficiency is lowered. For this reason, a background light source having a considerable intensity is required to obtain a picture image having a desired brightness. Thus, in a laptop word processors or computers which use a dry cell battery or an accumulative battery cell as a power supply source extended use is limited due to the excessive power consumption of the light source.

Also, in known LCDs, including the TN and STN LCD devices, since the liquid crystal is charged between two glass plates, a cell gap must be made within stringent range requirements to form a uniform picture image. Therefore, due to current technological limitations in the manufacturing of glass plates, enlarging LCD panels is hard to achieve.

Taking the above-described problems into consideration, in order to decrease the need for very precise cell gap adjustment, it has been known to eliminate the polarized plate to increase efficiency and instead use a single sheet of a base plate. Examples of LCD without a polarized plate include a cholesteric nematic transition (CNT) type which uses a phase transition effect and a dynamic scattering mode (DSM) type which was devised early in LCD development. The DSM type LCD exhibits slow response time and cannot be made thin. For those reasons it is no longer in common use.

Another example of an LCD not using a polarized plate to increase the efficiency of light is a polymer-dispersed liquid crystal display (PDLCD). However, since the PDLCD is made of a polymer material, more than half of whose volume is light-transmitting, the scattering of light is needed to obtain a clear contrast ratio. To attain these requirements, there is structural limitation that the thickness of the liquid crystal layer should be at least 20 $\mu$m.

An LCD which adopts an electrical field effect type liquid crystal having a new structure, in which the above conventional LCD problems are considerably improved, is the parent application to this continuation-in-part application, which bears U.S. patent application Ser. No. 08/058,712, was filed on May 10, 1993, and is expressly incorporated by reference herein.

The LCD described in the parent application Ser. No. 08/058,712 has a fast driving speed and a high light-utilization efficiency. Liquid crystal layer provided between the opposing electrodes is isolated by a plurality of insulation layers to form a multi-layer structure. A polarized plate is not used and only a single sheet of a glass substrate is applied. As shown in FIG.1, liquid crystal layers 20 of the electrical field effect type are provided between opposing electrodes 10 and 18. The thickness of each liquid crystal layers 20 is maintained by the columns 12. Insulation layers 22 for separating each liquid crystal layer 20 are provided between adjacent liquid crystal layers 20. The mutual location of insulation layers 22 is fixed by columns 12 which are provided locally. Injection holes 14 for locally injecting the liquid crystal are provided on one side of the insulation layer 22. Here, the thickness of each liquid crystal layer is less than or equal to 3 $\mu$m. The thickness of each layer of the insulation layer is preferably less than or equal to 5 $\mu$m. The insulation layer 22 can be made of an epoxy resin material, or a metal oxide, particularly an aluminum oxide.

FIG. 2 illustrates a top view of LCD, and, in particular, the arrangement of column 12 and injection holes 14 in relation to an electrode 10. FIGS. 3 and 4, illustrate the A—A and B—B cross sectional views of this LCD, respectively.

The manufacturing sequence of the above described reflective-type LCD by the above method is will be described with reference to FIG. 5-10.

In FIG.5, an electrode 18 of a predetermined pattern is formed of a conductive material on black plastic substrate 16.

In FIG.6, epoxy resin layer 20 and PVA layer 22a are alternately laminated a number of times on electrode 18 of FIG.5, by a spin coating or roll coating method. Then, an upper electrode 10 is formed of indium tin oxide (ITO) on epoxy resin layer 20.

In FIG.7, a photo mask pattern is formed on the surface of the uppermost epoxy resin layer, leaving a photoresist 24 as shown in FIG.7.

The portion not covered by photoresist 24 is plasma-etched to form a hole for column 12. Then, the hole is filled with the epoxy resin. At the same time, the epoxy resin is coated on the exposed surface to form column 12 and surface epoxy resin layer 26. Thereafter, a shielding plate 11 is formed over each column 12.

In FIG.8, liquid crystal inlet holes 14 are formed by photo mask patterning and plasma etching. Thereafter, water, acetone or alcohol is injected via inlet hole to thereby dissolve and remove each PVA layer 22a. Accordingly, inlet holes 14 and each portion 22b are left empty. Each epoxy resin layer 20 is supported by column 12 to sustain each liquid crystal layer portion space 22b.

In FIG. 9, after the resultant structure is dried, liquid crystal is coated on the whole upper surface thereof under a vacuum to fill each inlet hole 14 and evacuated portion 22b to form a liquid crystal layers 22. Thereafter, as shown in FIG. 10, an epoxy resin is coated on the whole surface to seal the liquid crystal inlet hole 14, and shielding plate 11 is formed directly above each column 12 and inlet hole 14 which require the light to be shielded. Accordingly, the reflective-type LCD shown in FIGS. 1 through 4 results. It should be noted that the shielding plate is not shown in FIGS. 1 through 4.

In the above described manufacturing method, water-soluble PVA is used as a dissolution layer, and epoxy resin is used as an insulation layer. However, the materials employed here are not limited to these. For instance, it is suggested that a metal such as aluminum can be used instead of the water-soluble PVA, and that a metal oxide can be used instead of the epoxy resin.

SUMMARY OF THE INVENTION

It is an object of the present invention to provide an method of efficiently manufacturing a multi-layered structure that is used in a liquid crystal display device.

To accomplish the object of the present invention a method of obtaining a multi-level liquid crystal device is described in which a metal layer is applied and then a portion thereof is oxidized to obtain an oxidized portion disposed over a non-oxidized portion. This sequence of applying a metal layer and then oxidizing a portion thereof repeated to obtain a layered structure. Thereafter, the non-oxidized layers are removed with a detergent, leaving empty layered spaces between oxidized insulation layers into which liquid crystal can be filled.

Accordingly, not only can the thickness of the insulation layers be easily adjusted, but also the surface thereof deviates only slightly with respect to the original smoothness of the surface of the metal layer before being oxidized. This improves uniformity of the LCD and results in improved picture quality, enabling the manufacture of a liquid crystal display device having a high definition image.

DETAILED DESCRIPTION OF THE PREFERRED EMBODIMENT

FIGS. 11 through 20 show the manufacturing steps of the reflective type LCD according to the present embodiment.

Figure 11:
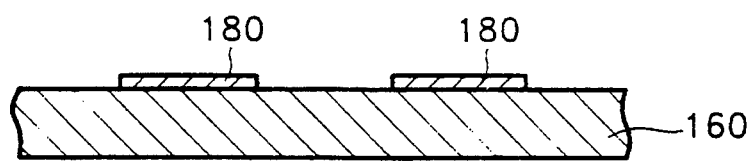
FIGS. 11 through 20 are views showing the manufacturing steps of the reflective type LCD according to the present inventions.

Referring to FIG. 11, a plurality of first electrodes 180 are formed of a conductive material such as ITO on a black plastic substrate 160 by a predetermined pattern, for example, a plurality of first electrodes 180 are formed as parallel stripes.

Figure 12:
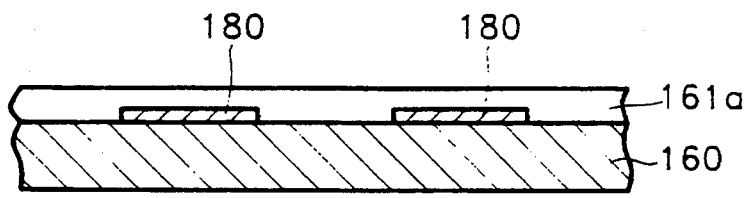

Thereafter, referring to FIG. 12, a light-transmitting electrode protective resin layer 161a, which is not dissolved by a predetermined detergent, is formed to a thickness of about 1,000 through 3,000 Å on the entire upper surface of substrate 160 on which the plurality of first electrodes 180 are formed.

Figure 13:
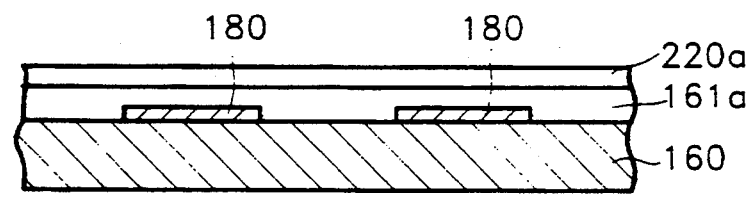

Next, referring to FIG. 13, a metal layer 220a having a predetermined thickness is formed on the surface of electrode protective resin layer 161a. This metal layer is formed of any one metal of Al, Ta, Nb, Zr or W, so as to also have a thickness of about 3,000 Å. A vapor deposition method or a sputtering method is appropriate for this metal layer formation. In the case of Al metal, the vapor deposition method is more appropriate.

Figure 14:
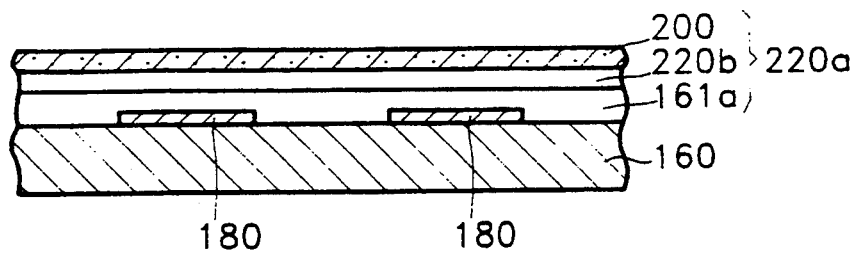

Referring to FIG. 14, about 1,500 Å A from the surface of metal layer 220a is oxidized so that the lower portion which is not oxidized becomes a dissolution layer 220b and the upper portion which is oxidized becomes an insulation layer 200. It is desirable to oxidize metal layer 220a using an anodic oxidation method.

Figure 15:
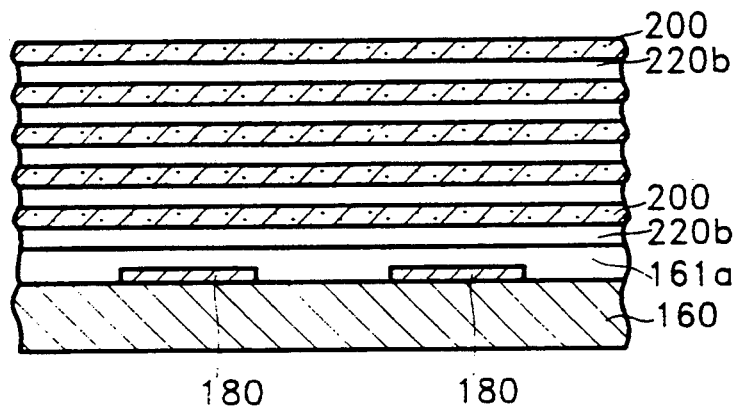

Referring to FIG. 15, the vapor deposition and the oxidation processes of Al, shown in FIGS. 13 and 14 are subsequently repeated. Four repetitions are illustrated to form the five-fold multi-layer structure composed of dissolution layers 220b and insulation layers 200.

Figure 16:
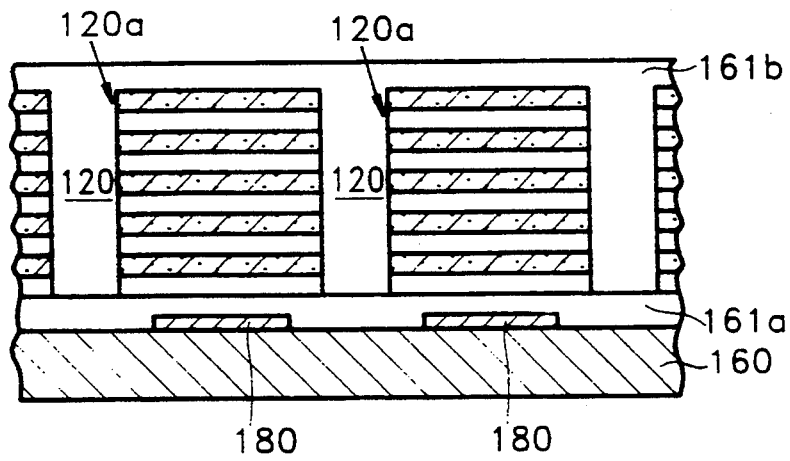

Thereafter, referring to FIG. 16, a plurality of first holes 120a is formed in the lamination. The first holes 120a are formed by applying a dry etching method using a gas of $CCl_4$ or $BCl_3$, after a photoresist having a pattern for the first holes is provided on the surface of the multi-layer structure. Thereafter, the photoresist, being temporarily formed is removed. An electrically insulating resin material is then filled into the plurality of first holes 120a to form a plurality of columns 120 and simultaneously coat the top surface of the multi-layer structure with the resin material, thereby forming a light-transmitting resin layer 161b for protecting a subsequently formed second electrode.

Figure 17:
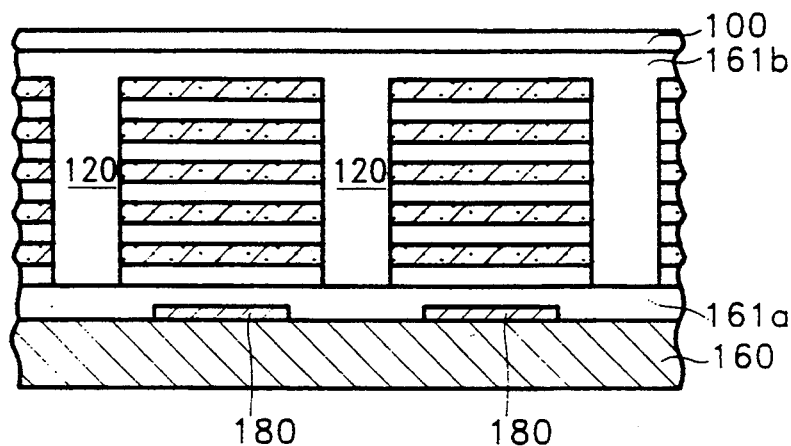
Figure 18:
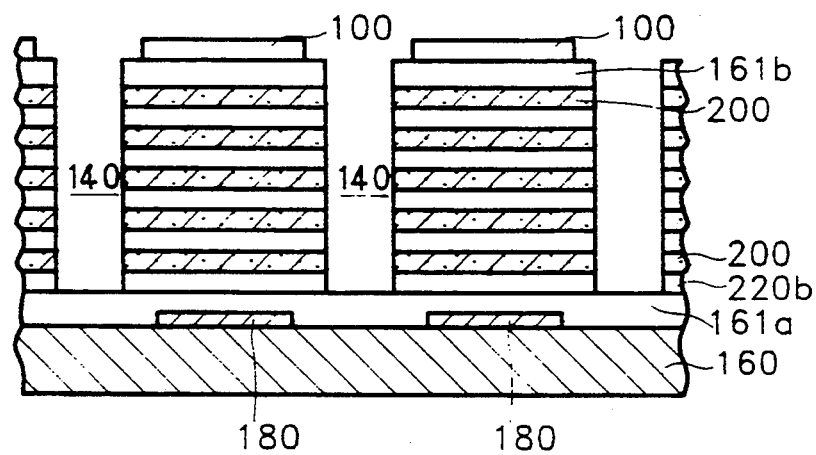

After formation of the resin layer 161b, referring to FIGS. 17 and 18, a plurality of second electrodes 100, corresponding to first electrodes 180, are formed on the upper surface of resin layer 161b in a predetermined pattern, for example, parallel stripes.

Figure 1:
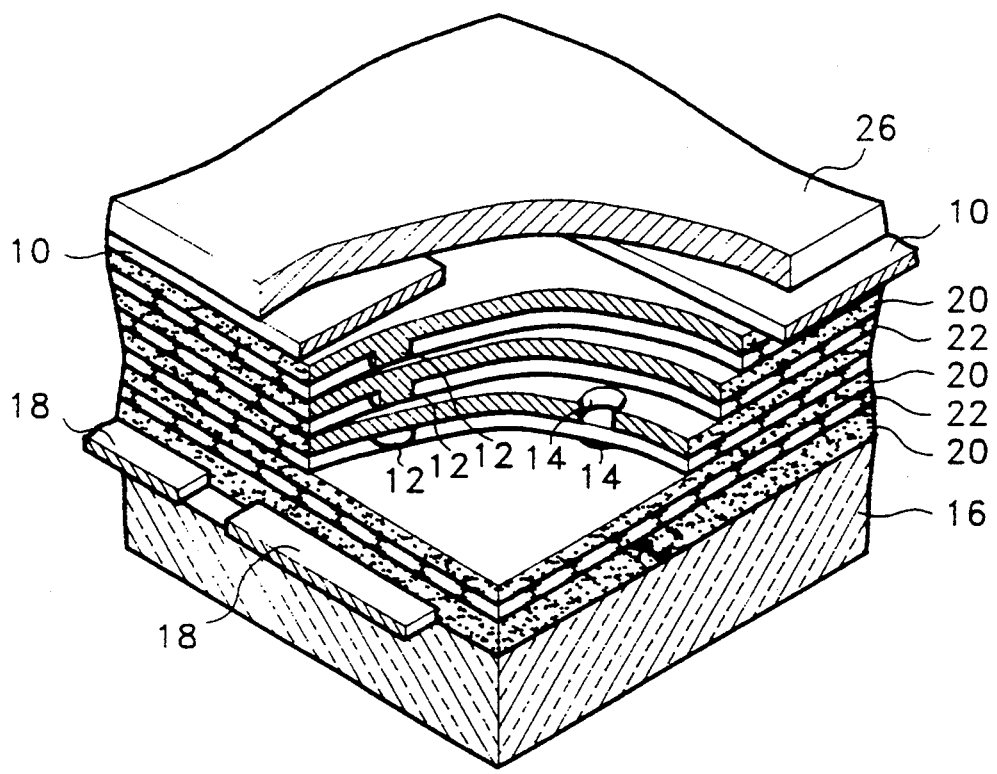
FIG. 1 is a schematically partly exploded perspective view of the reflective type LCD disclosed in the parent application.
Figure 2:
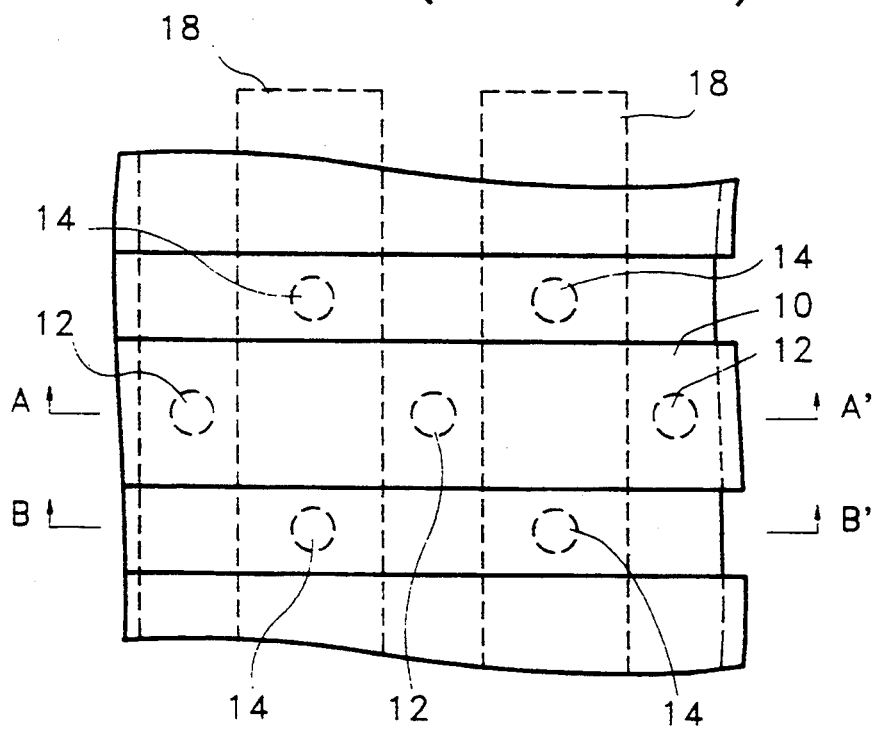
FIG. 2 is a partial plan view of the LCD of FIG. 1.
Figure 3:
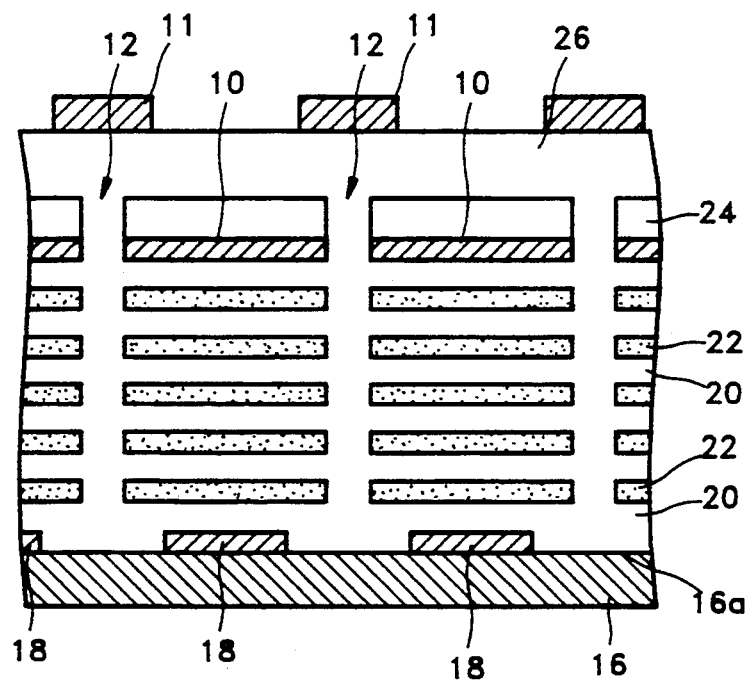
FIG. 3 is a cross-sectional view along a line A—A' of the LCD of FIG. 2.
Figure 4:
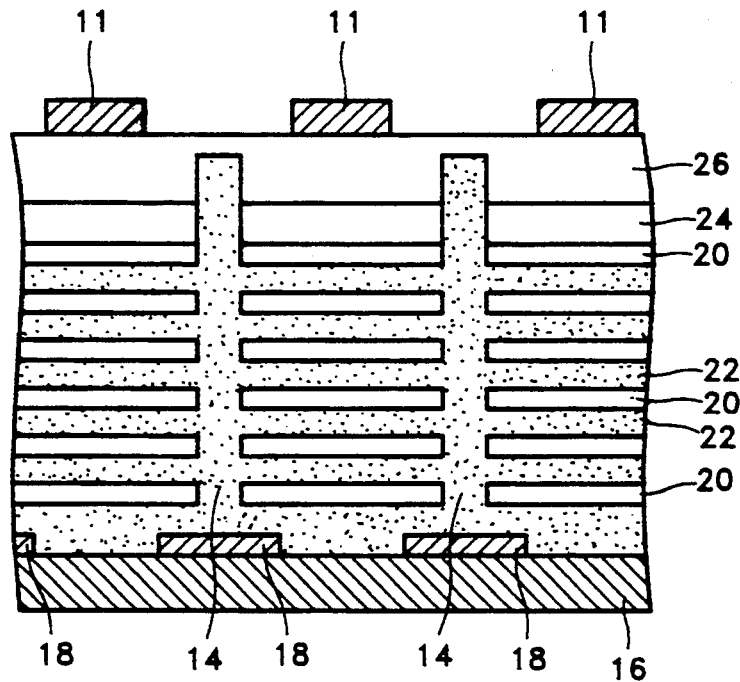
FIG. 4 is a cross-sectional view along a line B—B' of the reflective type LCD of FIG.2.
Figure 5:
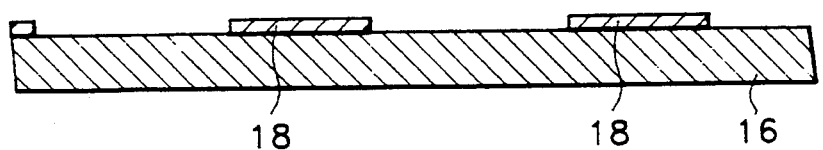
FIGS. 5 through 10 are views illustrating the manufacturing steps of the reflective type LCD of FIG. 1.
Figure 6:
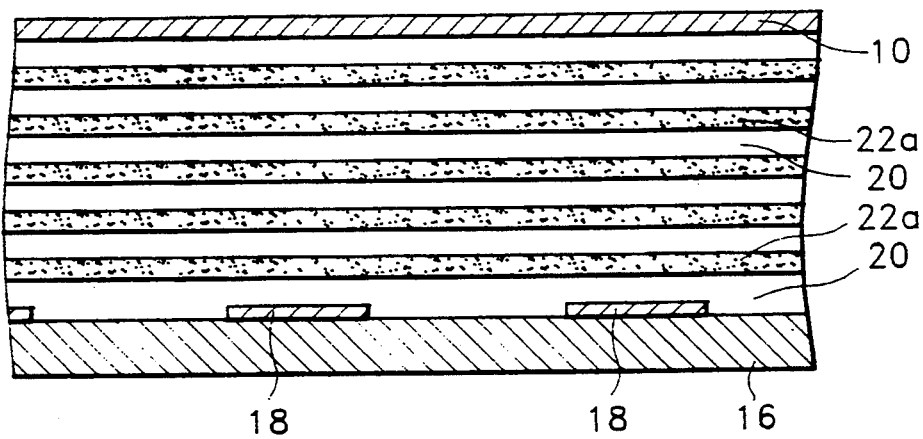
Figure 7:
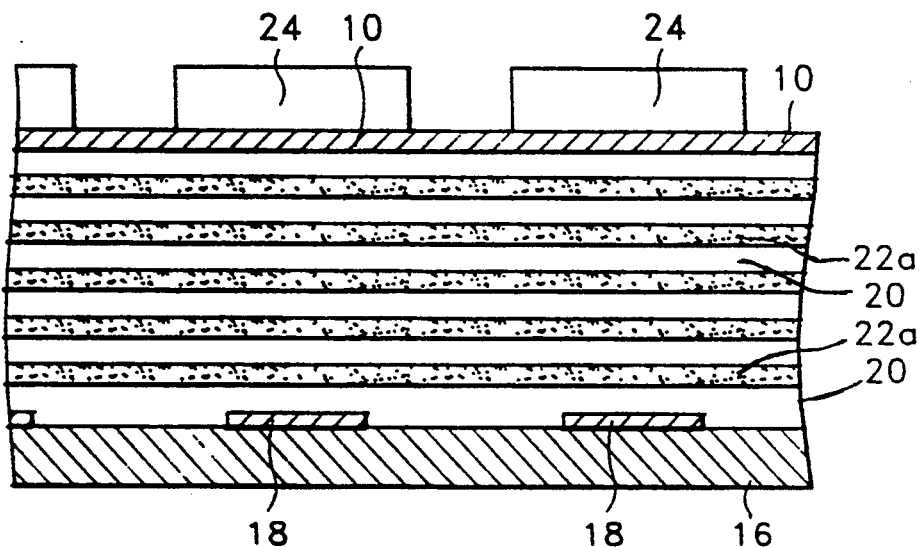
Figure 10:
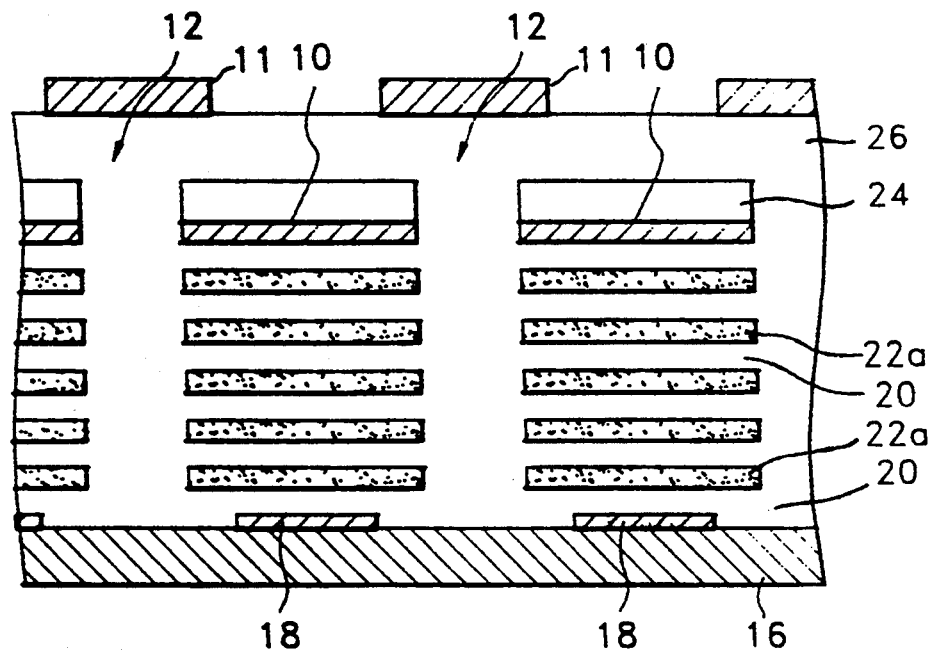
Figure 8:
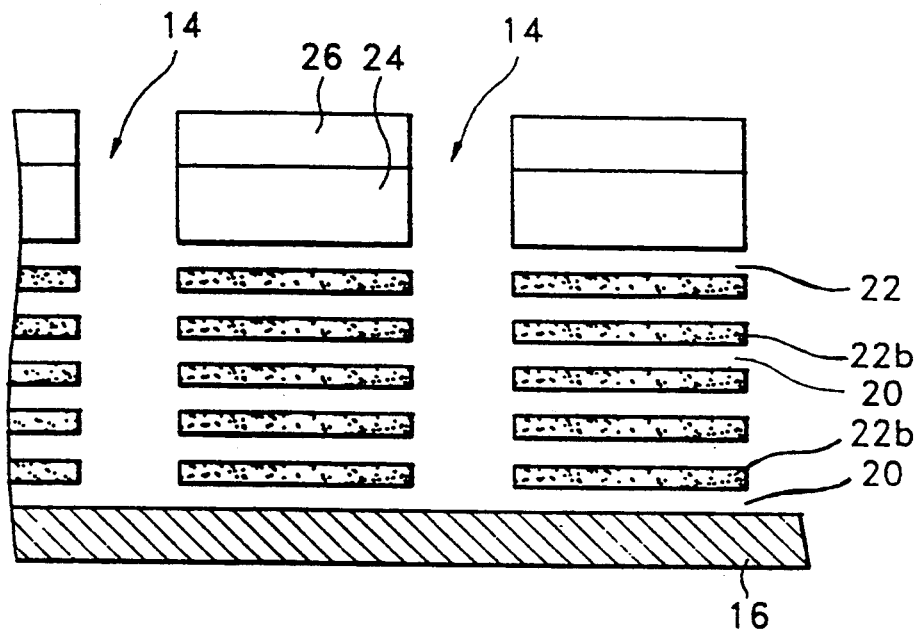
Figure 9:
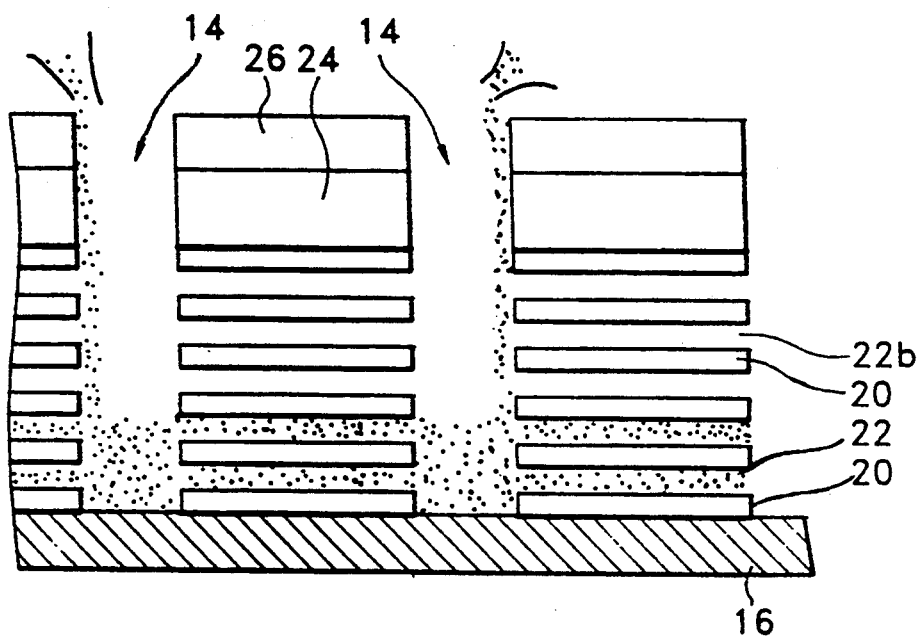

Thereafter, referring to FIG. 18, a plurality of inlet holes for injecting the liquid crystal from the upper surface of the multi-layer are formed in the multi-layer structure. A photoresist is applied on the surface of second electrode 100 and protective film 161b and portions then exposed between the second electrodes 100 to form a pattern for the partial etching. The pattern for the etching avoids the portion under which the columns have been previously formed as the illustrates same manner as illustrated in FIG. 2. Also, it is desirable that the pattern for the etching is provided on the portion under which the second electrode is not provided. In this state, the portion exposed by the pattern is etched by the dry etching method using a gas of $CF_4+O_2$ for etching protective film 161b with an organic resin of the surface, and by the dry etching method using a gas of $CCl_4$ or $BCl_3$ for etching inlet holes 140 into the metal layers 220b and oxidized metal layers 200. After inlet holes 140 are etched, the photoresist is removed.

Figure 19:
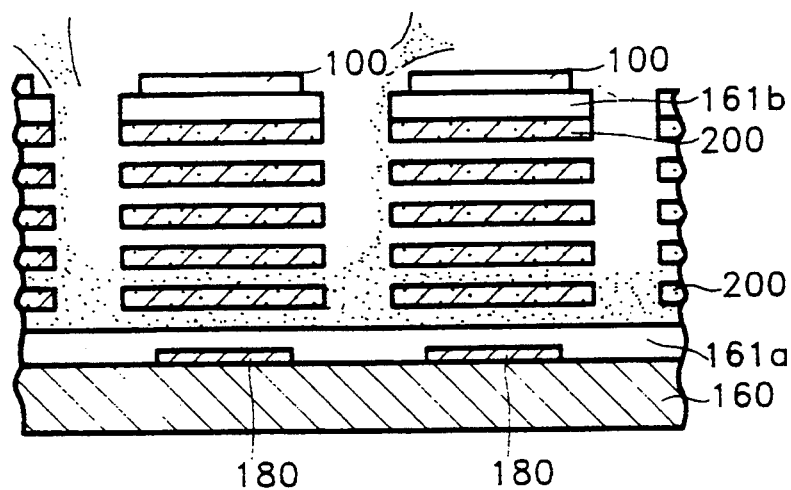

Thereafter, referring to FIG. 19, a detergent such as hydrochloric acid is supplied through inlet holes 140. Accordingly, the aluminum dissolution layer in the multi-layer structure is dissolved and removed over a period of several hours. Then, the resultant material is dried and placed in a vacuum chamber. Thereafter, a proper amount of liquid crystal is coated on the upper surface of the inlet holes. Then, by raising the pressure of the vacuum to atmospheric pressure, the liquid crystal fills into the empty portions 220, which are partitioned by the insulation layers.

Figure 20:
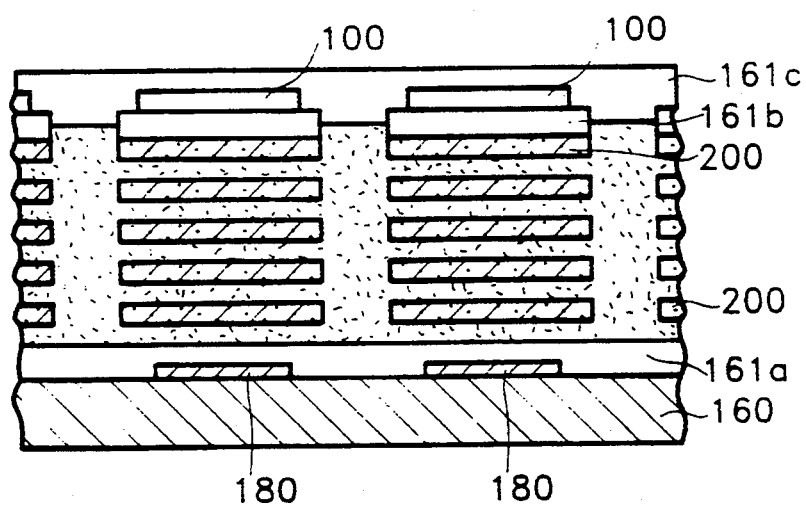

Subsequently, referring to FIG. 20, after the filling of the liquid crystal is completed, each inlet hole is sealed with a polymerized resin. At the same time, the second electrode is coated to form protective film 161c.

While the invention has been described in connection with what is presently considered to be the most practical and preferred embodiments, it is understood that the invention is not limited to the disclosed embodiment, but, on the contrary, is intended to cover various modifications and equivalent arrangements included within the spirit and scope of the appended claims.

What is claimed is:

1. A method of manufacturing a multi-layer portion of a liquid crystal display device into which liquid crystal is deposited, said multi-layered portion formed over a substrate containing an electrode over which is disposed a protective layer, comprising the steps of:

depositing a metal layer;

oxidizing a portion of said metal layer to obtain an oxidized insulation layer disposed over a non-oxidized layer;

repeating said depositing and oxidizing steps a predetermined number of times to obtain a layered structure containing a plurality of said oxidized insulation layers and said non-oxidized layers;

forming a support structure for said oxidized layers; and removing said non-oxidized layers to form empty spaces between said insulation layers into which said liquid crystal can be deposited.

2. A multi-layer portion manufacturing method according to claim 1, wherein said oxidizing step uses an anodic oxidation method.

3. A multi-layer portion manufacturing method according to claim 1, wherein said step of depositing said metal layer selects said metal from the group consisting of Al, Ta, Nb, Zr and W.

4. A multi-layer portion manufacturing method according to claim 2, wherein said step of depositing said metal layer selects said metal from the group consisting of Al, Ta, Nb, Zr and W.

5. A multi-layer portion manufacturing method according to claim 3, wherein said step of depositing said metal layer deposits aluminum to a thickness of at least 3,000 Å and wherein said step of oxidizing oxides about 1,500 Å of an upper portion of said deposited aluminum.

6. A multi-layer portion manufacturing method according to claim 4, wherein said step of depositing said metal layer deposits aluminum to a thickness of at least 3,000 Å and wherein said step of oxidizing oxides about 1,500 Å of an upper portion of said deposited aluminum.

7. A method of manufacturing a liquid crystal display device comprising the steps of:

forming a plurality of spaced first electrodes over a substrate;

depositing a light transmitting protective layer which cannot be dissolved by a predetermined detergent over said plurality of spaced first electrodes;

depositing a metal layer;

oxidizing a portion of said metal layer to obtain an oxidized insulation layer disposed over a non-oxidized layer;

repeating said depositing and oxidizing steps a predetermined number of times to obtain a layered structure containing a plurality of said oxidized insulation layers and said non-oxidized layers;

forming a plurality of second electrodes over an uppermost oxidized layer, each second electrode substantially aligned with one of said first electrodes;

forming a support structure for said oxidized layers;

removing said non-oxidized layers using said detergent to form empty spaces between said insulation layers;

filling said empty spaces with liquid crystal; and depositing a light-transmitting outer protective layer over said surface resulting from said liquid crystal and said second electrodes.

8. A liquid crystal manufacturing method according to claim 7 wherein said step of removing said non-oxidized layers includes the steps of:

forming a plurality of holes in predetermined locations; and applying said detergent within each of said plurality of holes to cause dissolution of said non-oxidized layers.

9. A liquid crystal manufacturing method according to claim 8 wherein after said step of filling said empty spaces with liquid crystal there includes a step of sealing said plurality of holes.

10. A liquid crystal manufacturing method according to claim 7 wherein said step of depositing said metal layer selects said metal from the group consisting of Al, Ta, Nb, Zr and W.

11. A multi-layer portion manufacturing method according to claim 7 wherein each of said metal layers has a thickness of at least 3,000 Å.

12. A multi-layer portion manufacturing method according to claim 7 wherein said oxidizing step uses an anodic oxidation method.

13. A multi-layer portion manufacturing method according to claim 10 wherein said oxidizing step uses an anodic oxidation method.

* * * * *